United States Patent
Nagase et al.

[11] 3,852,305
[45] Dec. 3, 1974

[54] ISOMERIZATION OF ALKENYL-ALKOXYBENZENES

[75] Inventors: Tsuneyuki Nagase; Gohu Suzukamo; Masami Fukao, all of Takatsuki, Japan

[73] Assignee: Sumitomo Chemical Company, Limited, Osaka-fu, Japan

[22] Filed: Nov. 16, 1971

[21] Appl. No.: 199,174

[30] Foreign Application Priority Data
Nov. 26, 1970 Japan.............................. 45-104647
June 23, 1971 Japan.............................. 46-045861

[52] U.S. Cl....... 260/340.9, 260/612 D, 260/613 D, 252/463
[51] Int. Cl............................................ C07d 13/00
[58] Field of Search.......... 260/612 D, 613 D, 340.9

[56] References Cited
UNITED STATES PATENTS

| | | | |
|---|---|---|---|
| 487,204 | 11/1892 | Ach .............................. | 260/613 D |
| 2,052,744 | 9/1936 | Bibb.............................. | 260/612 D |
| 2,457,074 | 12/1948 | Weinkauff ..................... | 260/613 D |
| 2,516,412 | 7/1950 | Pearl........................... | 260/613 D X |
| 2,666,771 | 1/1954 | Zettlemoyer et al. ....... | 260/613 D X |
| 2,682,474 | 6/1954 | Bell et al..................... | 260/613 D X |

FOREIGN PATENTS OR APPLICATIONS
972,639   10/1964   Great Britain................. 260/683.2

Primary Examiner—Bernard Helfin
Attorney, Agent, or Firm—Stewart & Kolasch, Ltd.

[57] ABSTRACT

A method of isomerization of alkenyl-alkoxybenzenes which comprises contacting an alkenyl-alkoxybenzene of the formula:

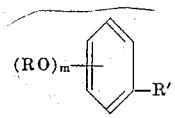

wherein $m$ is an integer of 1 to 5, R is lower alkyl or, when $m$ is two or more and at least two of R are adjacent, the adjacent two R may represent lower alkylene including methylene and R' is an alkenyl group having a double bond at the position not conjugated with the benzene ring with a catalyst to give the corresponding alkenyl-alkoxybenzene wherein the double bond in the alkenyl group represented by R' is migrated to the position conjugated with the benzene ring, the said catalyst being the one prepared by heating an alkali metal, an alkali metal hydroxide and alumina at a temperature higher than the melting point of the alkali metal.

14 Claims, 1 Drawing Figure

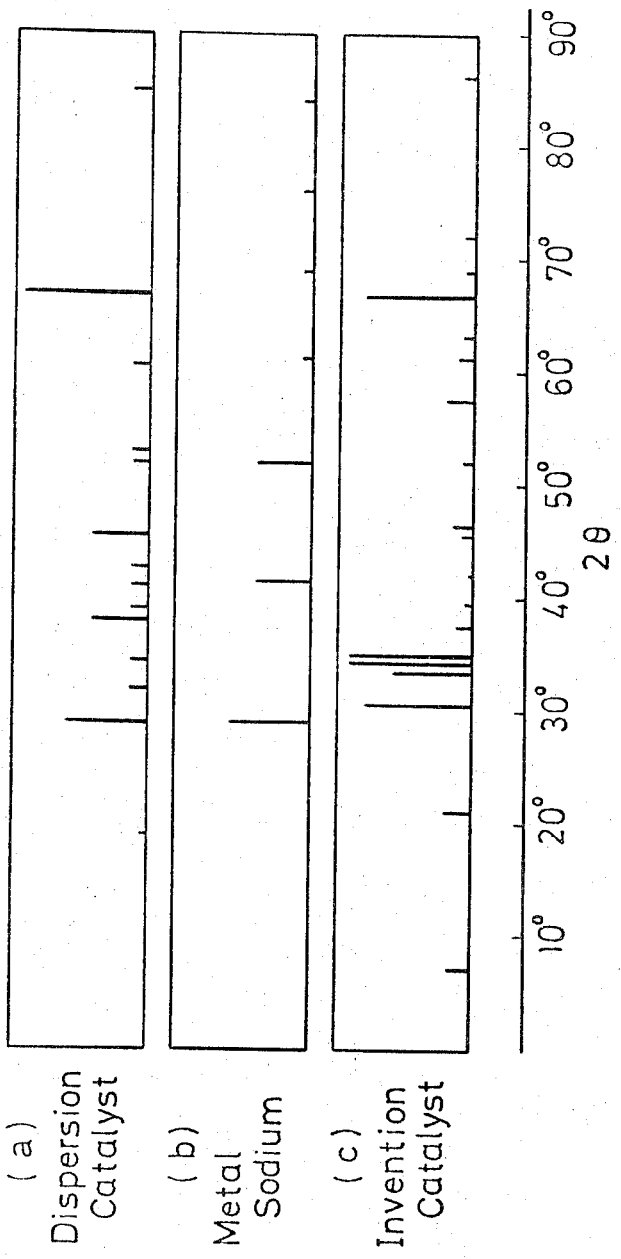

ISOMERIZATION OF ALKENYL-ALKOXYBENZENES

The present invention relates to isomerization of alkenyl-alkoxybenzenes. More particularly, it relates to a process for migration of a double bond in the alkenyl group of alkenyl-alkoxybenzenes from a position not conjugated with the benzene ring to a position conjugated with the benzene ring by the use of a novel catalyst.

The alkenyl-alkoxybenzenes as hereinabove mentioned are represented by the formula:

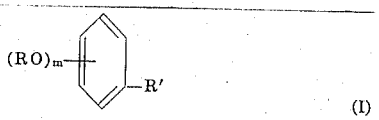
(I)

wherein $m$ is an integer of 1 to 5, R is lower alkyl or, when $m$ is two or more and at least two of R are adjacent, the adjacent two R may represent lower alkylene including methylene and R' is an alkenyl group having a double bond at the position not conjugated with the benzene ring.

For isomerization of the alkenyl-alkoxybenzenes of the said type, various acidic and basic catalyst compositions have been proposed. However, those known catalyst compositions are disadvantageous in requiring a relatively high temperature, an expensive solvent, a troublesome purification and so on.

It has now been found that the alkenyl-alkoxybenzene (I) is readily isomerized to the correspnding alkenyl-alkoxybenzene wherein the double bond in the alkenyl group is migrated to a position conjugated with the benzene ring in a nearly quantitative yield and with a high purity, when contacted with a specific, novel catalyst.

The said catalyst useful in the isomerization of the alkenyl-alkoxybenzene (I) can be prepared by heating an alkali metal, an alkali metal hydroxide and alumina at a temperature higher than the melting point of the alkali metal.

As the alkali metal, there may be used one or more of lithium, sodium, potassium, rubidium and other metals in Group I of the periodic table. These metals may be used in the form of an alloy consisting of two or more kinds of alkali metals. A typical example of such an alloy is sodium potassium alloy. Examples of the alkali metal hydroxide are hydroxides of lithium, sodium potassium, rubidium and other metals in Group I of the periodic table. One or more kinds thereof can be used. The alkali metal hydroxide is not necessarily required to correspond to the said alkali metal. Thus, the combination of the alkali metal and the alkali metal hydroxide to be employed may be, for instance, lithium and lithium hydroxide, sodium and sodium hydroxide, potassium and potassium hydroxide or rubidium and rubidium hydroxide as well as lithium and sodium hydroxide, sodium and potassium hydroxide or lithium and potassium hydroxide.

The alumina may be, for instance, α-alumina, -alumina, θ-alumina, δ-alumina, γ-alumina, η-alumina, χ-alumina or ρ-alumina. There may be also used such an alumina-containing material as kaolin or alumina silicate for the source of alumina. usually, however, the use of alumina itself is much favorable.

The amount of the alkali metal hydroxide with respect to the alumina is not limitative but is normally preferred to be 1/100 to 100 % by weight. The alkali metal may be employed in an equimolar or less amount, preferably in an equimolar to 1/100 molar amount, with respect to the alkali metal hydroxide.

For preparation of the catalyst, the said materials, i.e. the alkali metal, the alkali metal hydroxide and the alumina, are heated at a temperature higher than the melting point of the alkali metal (preferably from 200 to 500°C), ordinarily in an inert gas such as nitrogen, helium or argon while stirring. The reaction time is associated with the temperature of heating and may be usually from 1 to 30 hours. At a high temperature, the reaction time becomes necessarily short.

Practically, the alumina is first heated to a desired temperature and, while maintaining such temperature, the alkali metal hydroxide and the alkali metal are added thereto. Although the order of incorporation of these materials is optional, the order of the alumina, the alkali metal hydroxide and the alkali metal is the most preferred. In this case, the alkali metal hydroxide may be used in the form of an aqueous solution, provided that the water in such solution is sufficiently removed, usually under reduced pressure, prior to the addition of the alkali metal.

In the above procedure, the preparation of the catalyst may be started with the use of the alkali metal and an alumina having water removable therefrom, i.e. without using the alkali metal hydroxide. The term "removable water" hereinabove used is intended to mean not only movable water itself but also structural water and hydroxyl groups which can be eliminated in the form of water, inclusively. Thus, the alumina herein utilizable may be any alumina other than α-alumina which is considered to include no removable water. The water content in such utilizable alumina may be usually from 1.3 to 15 % by weight, favorably from 2.3 to 10 % by weight. The alkali metal is employed in an amount larger than that which can consume completely the water in the starting alumina, preferably 1.01 to 2 times the amount which can use up such water.

Actually, the reaction may be carried out by heating the alumina and a whole amount of the alkali metal together or by heating first the alumina with a portion of the alkali metal so as to consume substantially the water in the alumina and, after the addition of the remaining portion of the alkali metal, continuing the heating. In the latter case, the alkali metal which is initially used may be the same as or different from the one employed later. The reaction temperature and the reaction time may be entirely the same as those mentioned in connection with the procedure using the alkali metal hydroxide.

The said alternative procedure may be understood to be substantially the same as the previous procedure and falling within the scope of this invention, because the reaction is assumed to proceed as follows: a portion of the alkali metal is first reacted with the water removed from the alumina to produce the corresponding alkali metal hydroxide and then the remaining portion of the alkali metal, the produced alkali metal hydroxide and the resultant alumina are reacted with each other.

Different from a conventional dispersion catalyst wherein an alkali metal is dispersed on a carrier material having a large surface area such as alumina, silica gel, activated carbon or sodium carbonate (J.Am.-Chem.Soc., 82, 387 (1960)), the thus obtained catalyst does not contain the alkali metal. This is clearly evidenced by the following facts.

1. The catalyst of the invention is colored white to gray and does not show any pattern attributed to the alkali metal as a simple substance in the X-ray diffraction pattern (cf. FIG. (c) of the attached drawings), whereas the dispersion catalyst is colored violet to black and shows a pattern attributed to the alkali metal as a simple substance in the X-ray diffusion pattern (cf. FIGS. (a) and (b) of the attached drawings). In this connection, it is notable that the active dispersion catalyst shows a color inherent to the alkali metal as a simple substance such as violet black in case of potassium or black in case of sodium and, when it turns gray, the catalytic activity is lost (J.Chem.Soc., 1967, 2179).

2. When treated with liquid ammonia, the catalyst of the invention does not afford any color, whereas the dipsersion catalyst exhibits sensitively a dark violet color due to the alkali metal as a simple substance present therein.

Further, the catalyst of the invention may be differentiated from the dispersion catalyst in the essential use of the alumina for its preparation. That is, the use of any conventional carrier material other than and instead of the alumina in the preparation of the catalyst according to the present invention does not provide any composition having an appreciable catalytic activity, while the conventional dispersion catalyst prepared by the use of a conventional carrier material other than alumina such as activated carbon, silica gel or sodium carbonate shows the substantially same activity as the one prepared by the use of alumina.

It is particularly notable that the conventional dispersion catalyst is easily ignited on exposure to air or reacted readily with water to generate hydrogen whereby the catalytic activity is lost, while the catalyst of this invention is highly stable to air and water and maintains a strong catalytic activity with a long catalytic life. Thus, the catalyst of this invention can be handled without any special care in the atmosphere.

When the reaction of the alkali metal, the alkali metal hydroxide and the alumina according to this invention is carried out insufficiently and incompletely, the resulting composition may include unreacted alkali metal and exhibit some characteristics due to the same. The catalytic activity of such composition is inferior to that of the catalyst obtained by the complete proceeding of the reaction but still much higher than that of the conventional dispersion catalyst.

According to the present invention, the alkenyl-alkoxybenzene (I) is contacted with the said catalyst to give the corresponding alkenyl-alkoxybenzene wherein the double bond in the alkenyl group is migrated to a position conjugated with the benzene ring in a nearly quantitative yield and with a high purity.

Specific examples of the starting alkenyl-alkoxybenzene (I) are as follows: o-allylanisole, p-allylanisole, chavicol ethyl ether, methyleugenol, ethyleugenol, isoamyleugenol, benzyleugenol, 2,4-dimethoxy-1-allylbenzene, safrole, myristicin, croweacin, elemicin, apiol, gillapiol, 4-(penten-2-yl)anisole, etc.

Although any specific limitation does not exist on the amount of the catalyst to be employed, its use in 1/1000 to 1 part by weight to one part by weight of the starting alkenyl-alkoxybenzene (I) is usual. Particularly preferred is 1/100 to 1/5 part by weight of the catalyst to one part by weight of the starting alkenyl-alkoxybenzene (I).

The isomerization may be effected batchwise or continuously. The starting alkenyl-alkoxybenzene (I) may be charged in a reaction vessel together with the catalyst from the initiation of the reaction or may be continuously or intermittently added to the reaction vessel depending on the proceeding of the reaction.

The isomerization is usually carried out with the starting alkenyl-alkoxybenzene (I) not being preheated. Heating the reaction mixture is not required and, even if made, no unfavorable influence on the isomerization is seen.

If desired, an appropriate inert solvent such as a hydrocarbon (e.g. pentane, hexane, isopentane, dodecane) or ether (e.g. diethylether, tetrahydrofuran, dioxane) may be employed. For assuring the complete proceeding of the isomerization, the isomerization may be favorably effected in an inert gas.

The progress of the isomerization is usually examined by gas chromatographic analysis or any other instrumental analysis. Since the reaction proceeds quantitatively, the product is of high purity without applying any purification procedure thereto. If desired, however, it may be purified by a per se conventional procedure such as distillation or chromatography.

Specific examples of the thus obtained alkenyl-alkoxybenzene are as follows: o-anethole, p-anethole, p-anol ethyl ether, methylisoeugenol, ethylisoeugenol, isoamylisoeugenol, benzylisoeugenol, 2,4-dimethoxy-1-propenylbenzene, isosafrole, isomyristicin, isocroweacin, isoelemicin, isoapiol, gillisoapiol, 4-(penten-1-yl)anisole, etc.

Practical and presently preferred embodiments of the invention are illustratively shown in the following examples.

EXAMPLE A

In a 100 ml four-necked flask, activated alumina (50 g) was charged and stirred at 380 to 400°C for 2 hours under nitrogen. Sodium hydroxide (8.7 g) was portionwise added thereto at the same temperature, and the resultant mixture was stirred for 20 minutes. Then, metallic sodium (2.0 g) was portionwise added thereto, whereby the mixture became black but turned gradually white. After being stirred for 2 hours, the reaction mixture was allowed to cool to give a catalyst product. The product was not ignited upon exposure to air, and generation of hydrogen was not seen on admixture with water.

EXAMPLE B

In a 100 ml four-necked flask, activated alumina (50 g) was charged and stirred at 400°C for 2 hours under nitrogen. Sodium hydroxide (8.7 g) was portionwise added thereto at the same temperature, and the resultant mixture was stirred for 20 minutes. Then, metallic sodium (2.0 g) was portionwise added thereto, and stirring was continued for 30 minutes. The reaction mixture was allowed to cool to give a catalyst product. The product was colored gray or black due to the presence of unreacted metallic sodium.

EXAMPLE C

In a 100 ml four-necked flask, activated alumina (50 g) was charged and stirred at 400 to 420°C for 1.5 hours under nitrogen. Potassium hydroxide (12.2 g)

was portionwise added thereto at the same temperature, and the resultant mixture was stirred for 40 minutes. Then, metallic potassium (1.5 g) was portionwise added thereto over 10 minutes, and stirring was continued for 2 hours at the same temperature. The reaction mixture was allowed to cool to give a catalyst product.

EXAMPLE D

In a 100 ml four-necked flask, activated alumina (50 g) was charged and stirred at 400 to 420°C for 2.5 hours under nitrogen. Sodium hydroxide (8.7 g) was portionwise added thereto at the same temperature, and the resultant mixture was stirred for 70 minutes. Then, metallic potassium (1.5 g) was portionwise added thereto over 10 minutes, whereby the mixture became violet but turned gradually white. After being stirred for 2 hours, the reaction mixture was allowed to cool to give a catalyst product.

EXAMPLE E

In a 100 ml four-necked flask, alumina mainly consisting of $\gamma$ type (water content, 6.0 %) (50 g) was charged and heated up to 200°C under nitrogen while stirring. Metallic sodium (3.8 g) was portionwise added thereto at the same temperature over 20 minutes, and the resultant mixture was stirred for 1 hour. Then, the temperature was gradually raised up to 400°C, and metallic sodium (1.9 g) was portionwise added thereto over 10 minutes. Stirring was continued at the same temperature for 3.5 hours to give a catalyst product. The product was colored white, and the absence of metallic sodium was confirmed by the X-ray diffraction.

EXAMPLE F

In a 100 ml four-necked flask, alumina mainly consisting of $\chi$ and $\gamma$ types (water content, 1.6 %) (50 g) was charged and heated up to 400°C under nitrogen while stirring. Metallic potassium (1.8 g) was portionwise added thereto at the same temperature over 7 minutes, and the resultant mixture was stirred for 2 hours and allowed to cool to give a catalyst product. The product was colored greyish white, and the absence of metallic potassium was confirmed by the X-ray diffraction.

EXAMPLE G

In a 100 ml four-necked flask, $\gamma$-type alumina containing 10 % boehmite (50 g) was charged and heated up to 400°C under nitrogen while stirring. Metallic sodium (1.9 g) was portionwise added thereto at the same temperature over 5 minutes, and the resultant mixture was stirred for 2 hours and allowed to cool to give a catalyst product.

EXAMPLE H

In a 100 ml four-necked flask, alumina mainly consisting of $\chi$ and $\gamma$ types (water content, 2.0 %) (50 g) was charged and heated up to 400°C under nitrogen while stirring. Metallic sodium (2.5 g) was portionwise added thereto at the same temperature over 5 minutes, and the resultant mixture was stirred for 2 hours and allowed to cool to give a catalyst product. The product was colored black partly due to the presence of unreacted metallic sodium.

EXAMPLE I

In a 100 ml four-necked flask, alumina mainly consisting of $\rho$ type (water content, 8 %) (50 g) was charged and heated up to 300°C under nitrogen while stirring. Metallic sodium (5.2 g) was portionwise added thereto at the same temperature over 15 minutes, and the resultant mixture was stirred for 1 hour. Then, the temperature was gradually raised up to 400°C, and metallic sodium (1.8 g) was added thereto over 5 minutes. Stirring was continued at the same temperature for 2 hours, and the reaction mixture was allowed to cool to give a catalyst product.

EXAMPLE 1

In a 25 ml flask, safrole (5.0 g) was charged, and the atmosphere was replaced by nitrogen. The catalyst (1.0 g) obtained in Example A was added thereto, and the resultant mixture was stirred at room temperature (25°C). Samples of the reaction mixture were periodically taken and analyzed by gas chromatography. The reaction proceeded as shown in Table 1.

Table 1

| Time (min.) | Safrole (%) | Isosafrole (cis) (%) | Isosafrole (trans) (%) |
|---|---|---|---|
| 0 | 100 | 0 | 0 |
| 20 | 33.4 | 9.2 | 57.4 |
| 40 | 0 | 4.6 | 95.4 |
| 60 | 0 | 2.0 | 98.0 |

After elimination of the catalyst by filtration, the filtrate was distilled to give isosafrole (4.9 g). B.P., 135 to 135°C/20 mmHg.

EXAMPLE 2

In a reactor of 10 mm in inner diameter and of 50 cm in length, the catalyst (15 g) obtained in Example A was charged under a nitrogen stream. Safrole was continuously introduced therein from the upper part at a rate of 1.1 g/min., and the reacted product was taken out from the lower part. No depression in the catalytic activity was seen even after introduction of 200 g of safrole. The product was confirmed to be 100 % purity of isosafrole by gas chromatography.

EXAMPLE 3

In a 25 ml flask, o-allylanisole (5.0 g) was charged, and the atmosphere was replaced by nitrogen. The catalyst (1.0 g) obtained in Example A was added thereto, and the resultant mixture was stirred at room temperature. After 80 minutes, the gas chromatographic analysis of the reaction mixture showed the disappearance of the peak of o-allylanisole and showed the peak of o-anethole (4.8 g). B.P., 104 to 105°C/13 mmHg.

EXAMPLE 4

As in Example 3, the isomerization was carried out but using estragole in place of o-allylanisole. By the gas chromatographic analysis, it was confirmed that the isomerization was completed within 1 hour. The product was anethole (4.9 g). B.P., 113 to 114°C/14 mmHg.

EXAMPLE 5

In a 25 ml flask, methyleugenol (5.0 g) was charged, and the atmosphere was replaced by nitrogen. The catalyst (1.0 g) obtained in Example A was added thereto, and the resultant mixture was stirred at room temperature. After 2 hours, the gas chromatographic analysis of the reaction mixture revealed 99 % isomerization of methyleugenol. The product was methylisoeugenol (4.8 g). B.P., 184 to 185°C/70 mmHg.

EXAMPLE 6

In a 25 ml flask, a solution of myristicin (5.0 g) in anhydrous ether (5 ml) was charged, and the atmosphere was replaced by nitrogen. The catalyst (0.9 g) obtained in Example A was added thereto, and the resultant mixture was stirred under ether refluxing. After 2 hours, the catalyst was eliminated by filtration, and ether was evaporated from the filtrate. The resulting product was distilled under reduced pressure to give isomyristicin (4.3 g). B.P., 165 to 166°C/18 mmHg. The gas chromatographic analysis showed a purity of 96 % for the product.

EXAMPLE 7

In a 25 ml flask, 4-(penten-2-yl)-anisole (5.0 g) was charged, and the atmosphere was replaced by nitrogen. The catalyst (1.5 g) obtained in Example A was added thereto, and the resulting mixture was stirred at room temperature. After 1.5 hours, the catalyst was eliminated by filtration, and the filtrate was distilled under reduced pressure to give 4-(penten-1-yl)anisole (4.3 g) contaminated with 7 % of the unreacted starting compound. B.P., 104 to 106°C/3 mmHg.

EXAMPLE 8

As in Example 1, safrole (5.0 g) was subjected to isomerization at room temperature but using the catalyst (1.0 g) obtained in Example B. After 4 hours, the gas chromatographic analysis of the reaction mixture revealed 99 % isomerization of safrole to isosafrole.

EXAMPLE 9

In a 25 ml flask, safrole (5.0 g) was charged, and the atmosphere was replaced by nitrogen. The catalyst (1.3 g) obtained in Example C was added thereto, and the resultant mixture was stirred at room temperature. After 1 hour, the gas chromatographic analysis of the reaction mixture revealed 100 % isomerization of safrole to isosafrole consisting of 96 % of the trans isomer and 4 % of the cis isomer.

EXAMPLE 10

In a 25 ml flask, safrole (5.0 g) was charged, and the atmosphere was replaced by nitrogen. The catalyst (0.8 g) obtained in Example D was added thereto, and the resultant mixture was stirred at room temperature. After 1.5 hours, the gas chromatographic analysis of the reaction mixture revealed 99 % isomerization of safrole to isosafrole consisting of 98 % of the trans isomer and 2 % of the cis isomer.

EXAMPLE 11

In a 35 ml flask, safrole (10.0 g) was charged, and the atmosphere was replaced by nitrogen. The catalyst (1.5 g) obtained in Example E was added thereto, and the resulting mixture was stirred at room temperature. Sample of the reaction mixture were periodically taken and analyzed by gas chromatography. The reaction proceeded as shown in Table 2.

Table 2

| Time (min.) | Safrole (%) | Isosafrole (%) |
| --- | --- | --- |
| 0 | 100 | 0 |
| 10 | 54.3 | 45.7 |
| 40 | 9.8 | 90.2 |
| 80 | 0.3 | 99.7 |

After elimination of the catalyst by filtration, the filtrate was distilled to give isosafrole (9.7 g). B.P., 135 to 136°C/20 mmHg.

EXAMPLE 12

In a 25 ml flask, o-allylanisole (5.0 g) was charged, and the atmosphere was replaced by nitrogen. The catalyst (1.0 g) obtained in Example F was added thereto, and the resultant mixture was stirred at room temperature. After 80 minutes, the gas chromatographic analysis of the reaction mixture revealed 99.8 % isomerization of o-allylanisole. The product was confirmed to be o-anethole (4.7 g). B.P., 104 to 105°C/13 mmHg.

EXAMPLE 13

In a 35 ml flask, a solution of myristicin (5.0 g) in anhydrous ether (5 ml) was charged, and the atmosphere was replaced by nitrogen. The catalyst (1.0 g) obtained in Example G was added thereto, and the resultant mixture was stirred under refluxing. After 4 hours, the gas chromatographic analysis of the reaction mixture revealed 96 % isomerization of myristicin. After the catalyst was eliminated by filtration, ether was evaporated and the resulting product was distilled under reduced pressure to give isomyristicin (4.3 g). B.P., 165 to 166°C/18 mmHg.

EXAMPLE 14

In a 25 ml flask, 4-(penten-2-yl)anisole (5.0 g) was charged, and the atmosphere was replaced by nitrogen. The catalyst (1.0 g) obtained in Example H was added thereto, and the resultant mixture was stirred at 70°C. After 3 hours, the reaction mixture was distilled under reduced pressure to give a distillate (4.3 g) boiling at 104 to 106°C/3 mmHg. The distillate contained 92 % of 4-(penten-1-yl)anisole isomerized from 4-(penten-2-yl)anisole.

EXAMPLE 15

In a reactor of 10 mm in inner diameter and of 50 cm in length, the catalyst (10 g) obtained in Example I was charged under a nitrogen stream. Safrole was continuously introduced therein from the upper part at a rate of 1.0 g/min., and the reacted product was taken out from the lower part. No depression in the catalytic activity was seen even after introduction of 200 g of safrole. The product was confirmed to be 100 % purity of isosafrole by gas chromatography.

What is claimed is:

1. A method for isomerization of alkenylalkoxybenzenes which comprises contacting an alkenyl-alkoxybenzene of the formula:

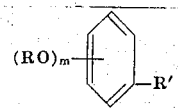

wherein $m$ is an integer of 1 to 5, R is lower alkyl or, when $m$ is 2 or more and at least two of R are adjacent, the adjacent two R may represent lower alkylene including methylene and R' is an alkenyl group having a double bond at the position not conjugated with the benzene ring, with a catalyst to give the corresponding alkenyl-alkoxybenzene wherein the double bond in the alkenyl group represented by R' is migrated to the position conjugated with the benzene ring, the said catalyst being prepared by heating alumina, from 0.01 to 100% by weight of the alumina of an alkali metal hydroxide, and from 0.01 to an equimolar amount with respect to the alkali metal hydroxide of an alkali metal at a temperature higher than the melting point of the alkali metal to give a catalyst composition which is colored white to gray and which does not show any X-ray diffraction pattern for alkali metal as a simple substance therein.

2. The method according to claim 1, wherein the catalyst is used in an amount of 1/1000 to 1 part by weight to one part by weight of the starting alkenyl-alkoxybenzene.

3. The method according to claim 1, wherein the catalyst is used in an amount of 1/100 to 1/5 part by weight to one part by weight of the starting alkenyl-alkoxybenzene.

4. The method according to claim 1, wherein the reaction is effected batchwise or continuously.

5. The method according to claim 1, wherein the reaction is effected in an inert gas.

6. The method according to claim 1, wherein the reaction is effected in an inert solvent.

7. A method for isomerization of alkenyl-alkoxybenzenes which comprises contacting an alkenyl-alkoxybenzene of the formula:

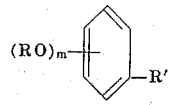

wherein $m$ is an integer of 1 to 5, R is lower alkyl or, when $m$ is 2 or more and at least two of R are adjacent, the adjacent two R may represent lower alkylene including methylene and R' is an alkenyl group having a double bond at the position not conjugated with the benzene ring, with a catalyst to give the corresponding alkenyl-alkoxybenzene wherein the double bond in the alkenyl group represented by R' is migrated to the position conjugated with the benzene ring, the said catalyst being prepared by heating alumina, from 0.01 to 100% by weight of the alumina of an alkali metal hydroxide and from 0.01 to an equimolar amount with respect to the alkali metal hydroxide of an alkali metal at a temperature from 200° to 500°C. to give a catalyst composition which is colored white to gray and which does not show any X-ray diffraction pattern for alkali metal as a simple substance therein.

8. A method for isomerization of alkenyl-alkoxybenzenes which comprises contacting an alkenyl-alkoxybenzene of the formula:

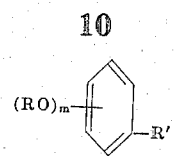

wherein $m$ is an integer of 1 to 5, R is lower alkyl or, when $m$ is 2 or more and at least two of R are adjacent, the adjacent two R may represent lower alkylene including methylene and R' is an alkenyl group having a double bond at the position not conjugated with the benzene ring, the said catalyst being prepared by heating an alkali metal and an alumina having water removable therefrom in a content of 1.3 to 15% by weight, the alkali metal being used in an amount of 1.01 to 2 times that which can be consumed completely by the water in the alumina at a temperature higher than the melting point of the alkali metal to give a catalyst composition which is colored white to gray and which does not show any X-ray diffraction pattern for alkali metal as a simple substance therein.

9. The method according to claim 8, wherein the catalyst is used in an amount of 1/1000 to 1 part by weight to one part by weight of the starting alkenyl-alkoxybenzene.

10. The method according to claim 8, wherein the catalyst is used in an amount of 1/100 to 1/5 part by weight to one part by weight of the starting alkenyl-alkoxybenzene.

11. The method according to claim 8, wherein the reaction is effected batchwise or continuously.

12. The method according to claim 8, wherein the reaction is effected in an inert gas.

13. The method according to claim 8, wherein the reaction is effected in an inert solvent.

14. A method for isomerization of alkenyl-alkoxybenzenes which comprises contacting an alkenyl-alkoxybenzene of the formula:

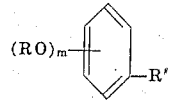

wherein $m$ is an integer of 1 to 5, R is lower alkyl or, when $m$ is 2 or more and at least two of R are adjacent, the adjacent two R may represent lower alkylene including methylene and R' is an alkenyl group having a double bond at the position not conjugated with the benzene ring, with a catalyst to give the corresponding alkenyl-alkoxybenzene wherein the double bond in the alkenyl group represented by R' is migrated to the position conjugated with the benzene ring, the said catalyst being prepared by heating an alkali metal and an alumina having water removable therefrom in a content of 1.3 to 15% by weight, the alkali metal being used in an amount of 1.01 to 2 times that which can be consumed completely by the water in the alumina at a temperature from 200° to 500° C. to give a catalyst composition which is colored white to gray and which does not show any X-ray diffraction pattern for alkali metal as a simple substance therein.

* * * * *